United States Patent
Zhao

(10) Patent No.: US 8,498,474 B2
(45) Date of Patent: Jul. 30, 2013

(54) METHODS FOR IMAGE CHARACTERIZATION AND IMAGE SEARCH

(75) Inventor: Juan Zhao, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 336 days.

(21) Appl. No.: 12/980,262

(22) Filed: Dec. 28, 2010

(65) Prior Publication Data

US 2011/0158519 A1    Jun. 30, 2011

(30) Foreign Application Priority Data

Dec. 31, 2009    (TW) ................. 98146415 A

(51) Int. Cl.
*G06K 9/00*    (2006.01)
*G06K 9/68*    (2006.01)

(52) U.S. Cl.
USPC .......................................... 382/165; 382/218

(58) Field of Classification Search
None
See application file for complete search history.

(56) References Cited

U.S. PATENT DOCUMENTS

| | | | | |
|---|---|---|---|---|
| 6,363,160 | B1* | 3/2002 | Bradski et al. | 382/103 |
| 6,463,432 | B1* | 10/2002 | Murakawa | 1/1 |
| 2001/0017940 | A1* | 8/2001 | Kim et al. | 382/162 |
| 2002/0080998 | A1* | 6/2002 | Matsukawa et al. | 382/103 |
| 2003/0179213 | A1* | 9/2003 | Liu | 345/619 |
| 2005/0244053 | A1* | 11/2005 | Hayaishi | 382/164 |
| 2006/0147094 | A1* | 7/2006 | Yoo | 382/117 |
| 2008/0284853 | A1* | 11/2008 | Juric et al. | 348/192 |
| 2009/0214109 | A1* | 8/2009 | Nakashima et al. | 382/163 |

FOREIGN PATENT DOCUMENTS

| | | |
|---|---|---|
| TW | 581976 | 4/2004 |
| TW | 200801990 | 1/2008 |

OTHER PUBLICATIONS

Zhang, L., Lin, F.Z., Zhang, B. "A CBIR method based on color-spatial feature", IEEE Region 10 Annual International Conference 1999:166-169.*
K. E. A. van de Sande, T. Gevers, and C. G. M. Snoek, "Evaluating color descriptors for object and scene recognition," IEEE Trans. Pattern Anal. Mach. Intell., vol. 32, No. 9, pp. 1582-1596, Sep. 2010.*
English language translation of abstract of TW 581976 (published Apr. 1, 2004).
English language translation of abstract of TW 200801990 (published Jan. 1, 2008).

* cited by examiner

*Primary Examiner* — Barry Drennan
*Assistant Examiner* — Feng Niu
(74) *Attorney, Agent, or Firm* — McClure, Qualey & Rodack, LLP

(57) ABSTRACT

Methods for image characterization image search are provided in the invention. An input image comprising a plurality of pixels is provided. The image is converted into Hue Saturation Value (HSV) model, each pixel comprises a hue level, a saturation level and a brightness level. Characteristics of the input image are then calculated based on the hue level, saturation level and the brightness level.

15 Claims, 4 Drawing Sheets

(1)

METHODS FOR IMAGE CHARACTERIZATION AND IMAGE SEARCH

CROSS REFERENCE TO RELATED APPLICATIONS

This application claims priority of Taiwan Patent Application No. 098146415, filed on Dec. 31, 2009, the entirety of which is incorporated by reference herein.

BACKGROUND OF THE INVENTION

1. Field of the Invention

The invention relates to methods for image characterization and image search, particularly for search in image database comprising large data amount, in order to improve search efficiency and accuracy.

2. Description of the Related Art

Conventionally, images are recorded in RGB format. While establishing image database, first the color histograms of images are extracted. Then image search is performed on the color histogram. FIG. 1A shows a color histogram. The horizontal axis represents the color level (generally from 0 to 255) and the vertical axis represents the ratio of the pixel amount. The ratio of the pixel amount is calculated by the amount of pixels in certain level divided with the total amount of overall pixels, and is range from 0 to 1. The three curves R, G and B represent the distribution of the three primary colors within an image from dark to light. Using color histogram has many advantages. For example, the extraction is easy and very efficient. In addition, the image characteristics may still remain invariant after translation and/or rotation.

FIG. 1B shows a method for extracting image characteristics. In step 101, first, an original image is inputted. In step 103, color distribution is calculated for each pixel to generate a color histogram, similar to that shown in FIG. 1A. In step 105, the characteristics of the image are finally determined according to the color histogram for performing later search. The method has drawbacks that the color histogram may not be able to reflect the spatial distribution due to its insensitiveness to the variations of image direction and image size. If two different images have similar color histograms, search might come up with error result.

It is therefore a desire need to provide improved methods for image characterization and image search.

BRIEF SUMMARY OF THE INVENTION

Embodiments of the invention provide methods for image characterization and image search. An embodiment of the invention provides a method for image characterization which comprises: providing an image comprising a plurality of pixels; converting the image into Hue Saturation Value (HSV) model, each pixel comprising a hue level, a saturation level and a brightness level; calculating the color levels of the pixels respectively, the color levels comprise hue level, saturation level and brightness level; and determining characteristics of the image according to the calculation result.

The calculation of the color levels comprises following: calculating a first ratio of each level to generate a cumulative histogram, the first ratio of a certain level is calculated by dividing cumulative amount of pixels up to the certain level with the total amount of pixels in the image; calculating a second ratio of each level to determine one or more key levels, the second ratio of a certain level is calculated by dividing the amount of pixels of the certain level with the total amount of pixels in the image; and calculating one or more invariant moments of each key level according to the cumulative histogram.

Another embodiment of the invention also provides a method for image search. The method comprises: providing an image database comprising a plurality of images and corresponding characteristics; providing an input image comprising a plurality of pixels; calculating characteristics of the input image; comparing the characteristics of the input image with the characteristics of the plurality of images in the image database. The characteristics are calculated as below.

The step of characteristic calculation comprises: converting the input image into Hue Saturation Value (HSV) model, each pixel comprises a hue level, a saturation level and a brightness level; and calculating the characteristics of the input image according to the hue levels, the saturation levels and the brightness levels of the plurality of pixels.

The step of comparing the characteristics comprises: selecting a reference image and corresponding reference characteristics, the reference characteristics comprising at least one reference key hue level and corresponding plurality of reference hue invariant moments, at least one key saturation level and corresponding plurality of reference saturation invariant moments, at least one brightness level and corresponding plurality of reference brightness invariant moments; applying the plurality of invariant moments corresponding to each of the key hue level with the plurality of reference hue invariant moments to an Euclidean distance formula to generate a hue similarity; applying the plurality of invariant moments corresponding to each of the key saturation level with the plurality of reference saturation invariant moments to the Euclidean distance formula to generate a saturation similarity; applying the plurality of invariant moments corresponding to each of the key brightness level with the plurality of reference brightness invariant moments to the Euclidean distance formula to generate a brightness similarity; and linearly combining the hue similarity, the saturation similarity and the brightness similarity to generate a similarity result.

Yet another embodiment of the invention provides a method for image search. The method comprises providing an input image; selecting a reference image from an image database; determining a similarity result of the reference image to the input image according to characteristics of the reference image and the input image; and outputting the reference image and corresponding information when the similarity result exceeds a predetermined threshold.

The similarity result is determined as following: determining similarity values with respect to hue, saturation and brightness levels according to the characteristics of the reference image and the input image; multiplying the similarity value of each level to a weight coefficient respectively; summing the multiplied similarity values to generate the similarity result.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out of the invention. This description is made for the purpose of illustrating the general principles of the invention and should not be taken in a limiting sense. The scope of the invention is best determined by reference to the appended claims.

Figure 1A:
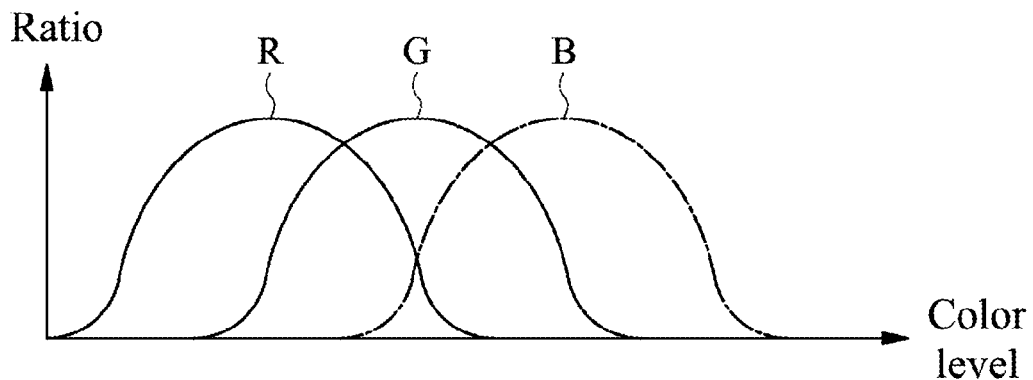
FIG. 1A shows a conventional color histogram.
Figure 1B:
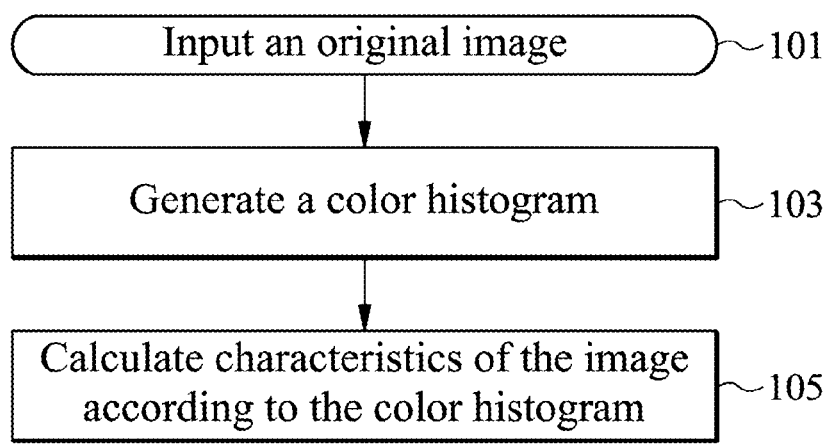
FIG. 1B shows a conventional method for image characterization.
Figure 2:
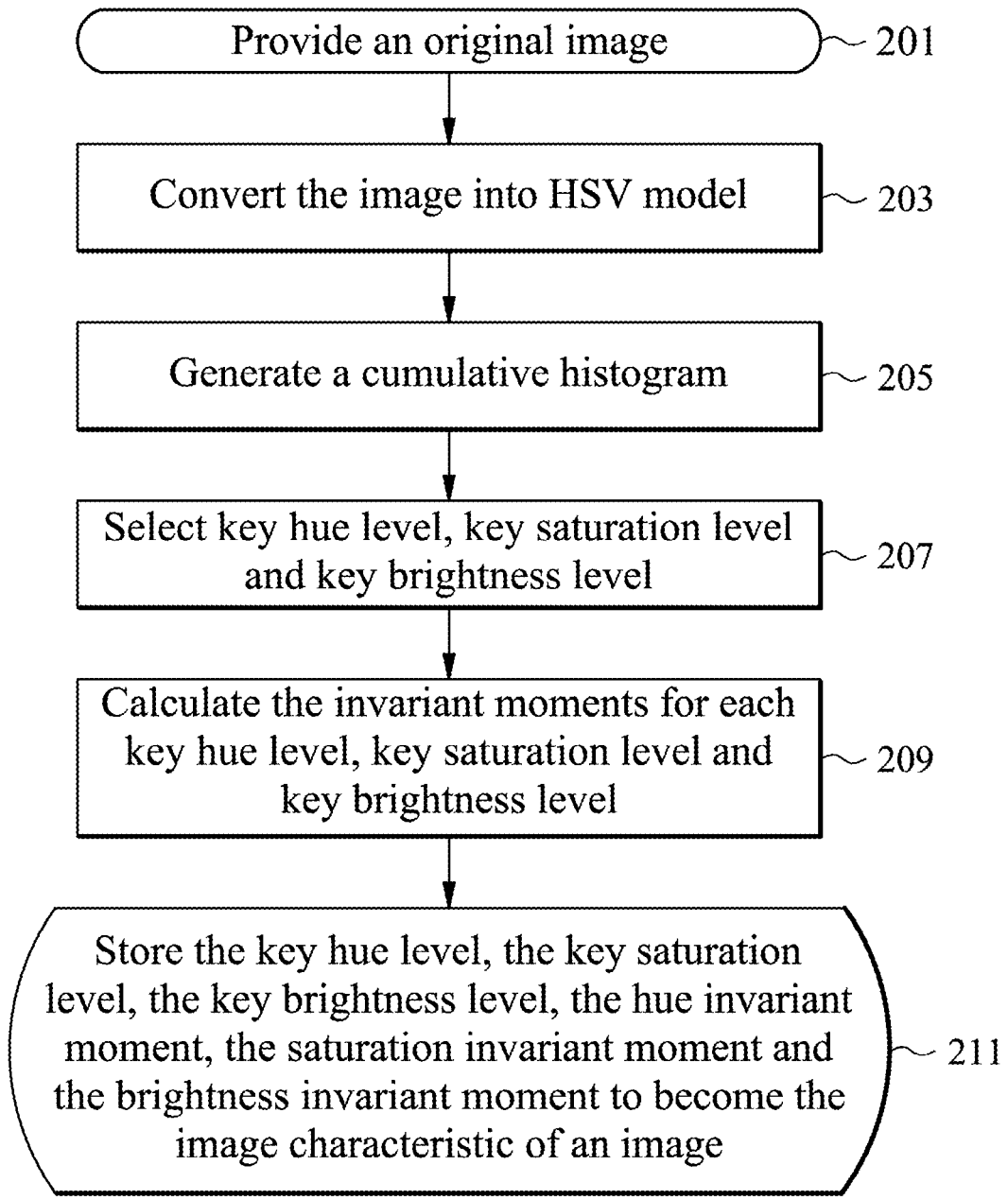
FIG. 2 is a flowchart showing a method for image characterization according to an embodiment of the invention.

FIG. 2 is a flowchart showing a method for image characterization according to an embodiment of the invention. In order to improve the efficiency of image search, the embodiment of the invention utilizes the HSV model to extract image characteristics. In addition, only key color information is referenced when extracting image characteristics so that disturbance brought by subsidiary information can be reduced, thereby reduce computation load. Furthermore, invariant moment is induced in the concept of the invention in order to provide better spatial distribution in the image characteristics, and thus improve image search accuracy. In step 201, an image comprising a plurality of pixels is provided. Then, in step 203, the image is converted into HSV model, in which each pixel comprises a hue level, a saturation level and a brightness level. HSV coordinate is more capable to reflect human sensibility in terms of color than the RGB coordinate. H represents hue, S represents saturation (also referred as chroma) and V means value (also referred as brightness). The conversion of the color coordinates may be performed according to the following formula:

$$H = \begin{cases} \arccos\dfrac{(R-G)+(R-B)}{2\sqrt{(R-G)^2+(R-B)(G-B)}} & B \le G \\ 2\pi - \arccos\dfrac{(R-G)+(R-B)}{2\sqrt{(R-G)^2+(R-B)(G-B)}} & B > G \end{cases}$$

$$S = \frac{\max(R,G,B) - \min(R,G,B)}{\max(R,G,B)}$$

$$V = \frac{\max(R,G,B)}{255},$$

In the case that R=G=B, it would result in H being undefined. Thus, H is defined as 125.5, S=0 and V=R/255 in the condition that R=G=B.

Then in step 205, an HSV cumulative histogram is extracted from the converted image in HSV model. Color histogram is a statics diagram that represents quantity distribution of image pixels. The cumulative histogram represents quantity distribution in cumulative way and forms an absolute increasing linear relationship. Human eyes have limited sensitivity to colors. For example, human eyes are not sensitive to small variations in hue levels. As a result, variation within a certain range is hard to be detected in the condition that saturation and brightness levels remain the same. To cope with such visual behavior, one of the solutions is to enlarge the sampling interval. For example, taking samples from every one level to every two levels. However, this solution would increase the search error as well. By cumulating the pixels, the robustness of color histogram can be increased and thus improve the search accuracy by reducing error.

In step 207, it is determined the hue, saturation and brightness levels having the highest frequency to occur. One or more levels can be determined And those levels are selected as key hue level, key saturation level and key brightness level. In the embodiment of the invention, statistic analysis is only performed with respect to the key hue level, the key saturation level and the key brightness level. Other subsidiary information is omitted to increase the efficiency of calculation.

In step 209, the invariant moments with respect to each key hue level, key saturation level and key brightness level are calculated. The fundamental theory of invariant moment may be found in the article "Visual Pattern Recognition by Moment Invariants" by Hu in 1962, in which proves that the central moment of an image can be used to extract seven invariant moments, and these moments are invariant to shifting, scaling and rotation. The invention introduces key hue level, key saturation level and key brightness level to the calculation of invariant moments and from which extracts the image characteristics.

In step 211, once the hue invariant moments, the saturation invariant moments and the brightness invariant moments are determined, these values are stored with the key hue level, the key saturation level and the key brightness level as the image characteristics.

Figure 3A:
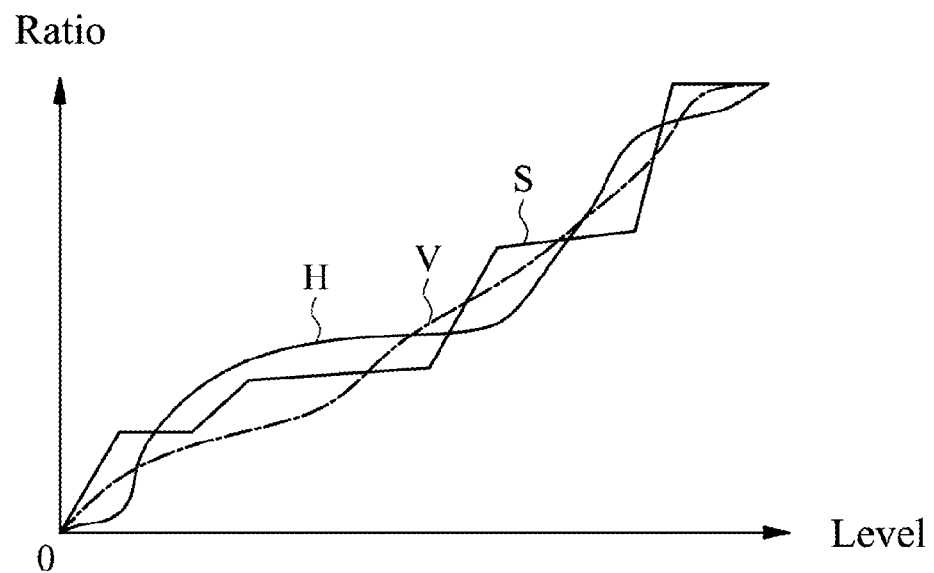
FIG. 3A shows a schematic diagram of a HSV cumulative histogram according to an embodiment of the invention.

FIG. 3A shows a schematic diagram of a HSV cumulative histogram generated from FIG. 2 according to an embodiment of the invention. The horizontal axis represents the color level, and the vertical axis represents the ratio of the cumulative amount of pixels up to certain level with respect to the total amount of pixels. The ratio is ranged between 0 and 1. For hue, the level is ranged from 0 to 360 degrees ($2\pi$). The ratio corresponding to a certain hue level is the cumulative amount of pixels having equal or smaller hue level. Therefore, the H curve generated from above will be an absolute increasing cumulative curve. For saturation, the level is ranged from 0 to 100. Similarly, the ratio of each saturation level is the cumulative amount of pixels having equal or smaller saturation level. Thus, an absolute increasing S curve can be generated. For brightness, the level is ranged from 0 to 100, and similarly a V curve can be generated.

Figure 3B:
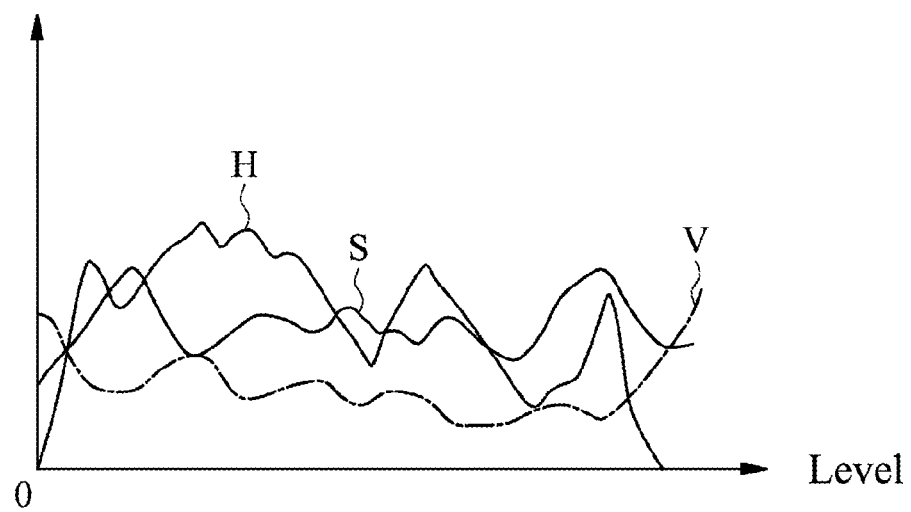
FIG. 3B shows a schematic diagram of a distribution histogram according to an embodiment of the invention.

FIG. 3B shows a schematic diagram of a distribution histogram for determination of the key hue level, the key saturation level and the key brightness level according to an embodiment of the invention. In FIG. 3B, the horizontal axis represents the color level and the horizontal axis represents the amount of pixels. FIG. 3B is different from the FIG. 3A in that the amount corresponding to each level is the amount of pixels having equal level. Therefore, the H, S and V curves shown in FIG. 3B reflect the hue level, the saturation level and the brightness level distributions of image pixels respectively. Accordingly, key hue levels can be selected from the H curve directly by picking hue levels with higher frequency. The key hue levels are represented as H=[$h_1, h_2, h_3, \ldots, h_n$]. Similarly, saturation levels with higher frequencies are selected from the S curve and thus obtain the key saturation levels S=[$s_1, s_2, s_3, \ldots, s_n$]. Similarly, the key brightness levels V=[$v_1, v_2, v_3, \ldots, v_n$] is directly selected from the V curve.

Once the key hue levels, key saturation levels and key brightness levels are obtained, the invariant moments can be further determined.

To calculate the hue invariant moments, a key hue level $h_i$, a horizontal order p and a vertical order q are applied to a central moment cumulative function $u_{pq}$ to generate a seed function η. The central moment cumulative function may be represented as follow:

$$u_{pq} = \sum_x \sum_y (x-\bar{x})^p (y-\bar{y})^q h_i; \qquad (1)$$

and the seed function may be represented as follow:

$$\eta_{pq} = \frac{u_{pq}}{u_{00}^r}$$

where $$r = \frac{p+q}{2}, \qquad (2)$$

$h_i$ is one of the key hue levels (i=1 to n), p is the horizontal order, q is the vertical order, (x, y) is the coordinate of each pixel in the image, and $(\bar{x}, \bar{y})$ is the coordinate of the image center of mass.

Then seed functions generated from multiple different horizontal orders and vertical orders are combined together to generate hue invariant moments corresponding to the key hue level. In this embodiment, the four invariant moments in Hu's article are utilized, and the combination with horizontal orders and vertical orders are illustrated as follows:

$$\psi_1 = \eta_{20} + \eta_{02} \qquad (3)$$

$$\psi_2 = (\eta_{20} - \eta_{02})^2 + 4\eta_{11}^2 \qquad (4)$$

$$\psi_3 = (\eta_{30} - 3\eta_{12})^2 + (3\eta_{21} - \eta_{03})^2 \qquad (5)$$

$$\psi_4 = (\eta_{30} + \eta_{12})^2 + (\eta_{21} + \eta_{03})^2 \qquad (6),$$

$\lambda_{hi} = [\psi_1, \psi_2, \psi_3, \psi_4]$ represents the hue invariant moments corresponding to the key hue level $h_i$ and is one of the characteristics of image according to the spirit of the invention. Although the foregoing formulas (1) to (6) are exemplified by the key hue level, but similarly key saturation invariant moments and key bright invariant moments can be obtained by replacing the key hue level $h_i$ with the key saturation level $s_i$ or the key brightness level $v_i$.

In whole, the characteristics of an image may include the following:

$$H = [h_1, h_2, h_3, \ldots, h_n] \qquad (7)$$

$$S = [s_1, s_2, s_3, \ldots, s_n] \qquad (8)$$

$$V = [v_1, v_2, v_3, \ldots, v_n] \qquad (9)$$

$$\lambda_H = [\lambda_{h1}, \lambda_{h2}, \lambda_{h3}, \ldots, \lambda_{hn}] \qquad (10)$$

$$\lambda_S = [\lambda_{s1}, \lambda_{s2}, \lambda_{s3}, \ldots, \lambda_{sn}] \qquad (11)$$

$$\lambda_V = [\lambda_{h1}, \lambda_{h2}, \lambda_{h3}, \ldots, \lambda_{hn}] \qquad (12)$$

H, S and V represent the key hue level, the key saturation level and the key brightness level respectively, while $\lambda_H$, $\lambda_S$ and $\lambda_V$ represent the arrays of the key hue invariant moments, the key saturation invariant moments and the key bright invariant moments. Based on aforementioned calculations of characteristics, an image database may be built effectively. In the database, massive amount of images can be converted into characteristics and be stored together with image information for search, such as copyright, author, publish year, content description and so on.

Figure 4:
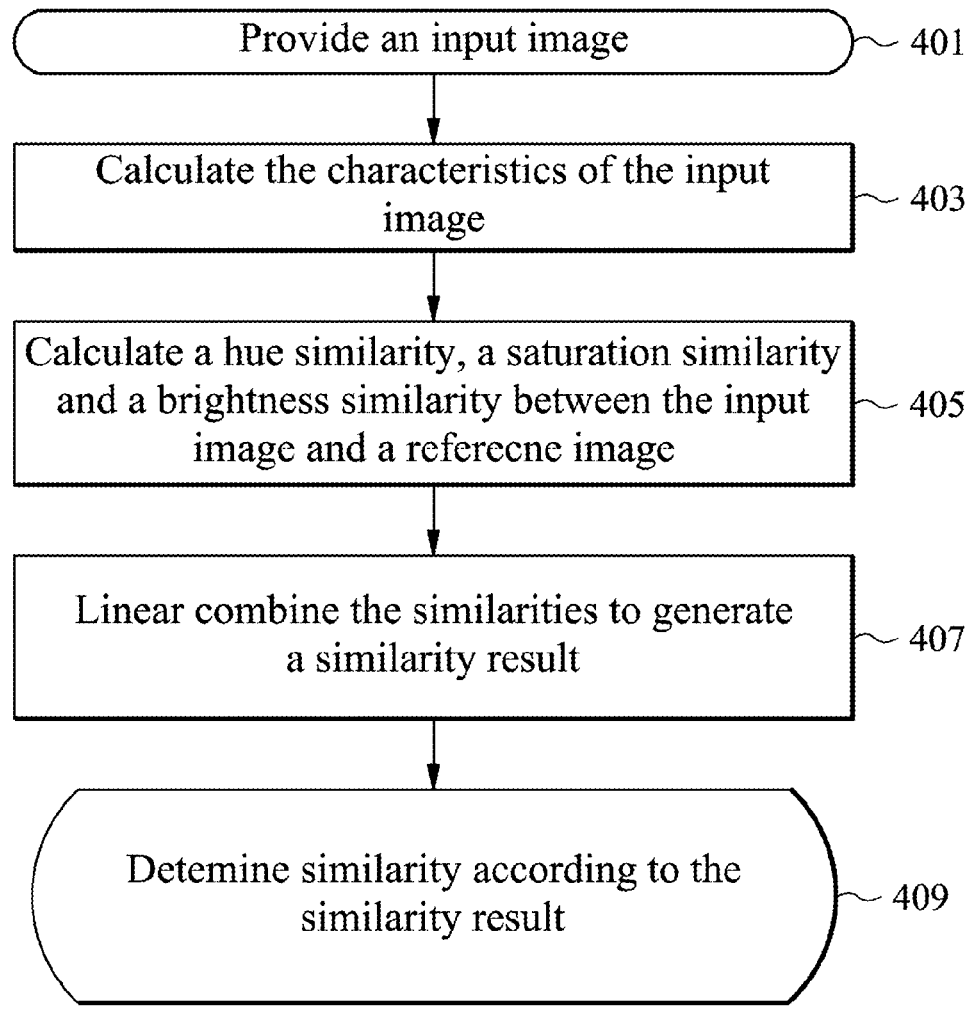
FIG. 4 is a flowchart showing a method for image search according to an embodiment of the invention.

FIG. 4 is a flowchart showing an image search method according to an embodiment of the invention. In step 401, an input image is provided. In step 403, characteristics of the input image are calculated according to the image characterization method provided in the invention. The characteristics are represented by formulas (6) to (12). Next in step 405, a reference image is selected from the database, and a hue similarity, a saturation similarity and a brightness similarity between the input image and the reference image are calculated. In step 407, the hue value similarity, the saturation value similarity and the brightness similarity are multiplied with corresponding weights respectively and then summed up to generate a similarity result. Finally, in step 409, the similarity of the two images is determined according to the similarity result. If the determination is yes, the information corresponding to the reference image is outputted as search result. Basically, steps of above described image search method are executed recursively by selecting different reference images from the image database and comparing with the input image until correct search result is generated.

In the calculation of similarity, reference characteristics of the reference image are output from the database first. The reference characteristics essentially comprise the reference key hue levels $H^R$, the reference key saturation levels $S^R$ and the reference key brightness levels $V^R$, and may be represented as follows:

$$H^R = [h_1^R, h_2^R, h_3^R, \ldots, h_n^R] \qquad (13)$$

$$S^R = [s_1^R, s_2^R, s_3^R, \ldots, s_n^R] \qquad (14)$$

$$V^R = [v_1^R, v_2^R, v_3^R, \ldots, v_n^R] \qquad (15)$$

The corresponding hue invariant moments, saturation invariant moments and brightness invariant moments of the reference image may be represented as following:

$$\lambda_H^R = [\lambda_{h1}^R, \lambda_{h2}^R, \lambda_{h3}^R, \ldots, \lambda_{hn}^R] \qquad (16)$$

$$\lambda_S^R = [\lambda_{s1}^R, \lambda_{s2}^R, \lambda_{s3}^R, \ldots, \lambda_{sn}^R] \qquad (17)$$

$$\lambda_V^R = [\lambda_{h1}^R, \lambda_{h2}^R, \lambda_{h3}^R, \ldots, \lambda_{hn}^R] \qquad (18)$$

Then, the hue similarity, the saturation similarity and the brightness similarity between the two images are calculated by utilizing Euclidean distance formula:

$$u_H = \sqrt{\Sigma(\lambda_H - \lambda_H^R)^2} \qquad (19)$$

$$u_S = \sqrt{\Sigma(\lambda_S - \lambda_S^R)^2} \qquad (20)$$

$$u_V = \sqrt{\Sigma(\lambda_V - \lambda_V^R)^2} \qquad (21),$$

$u_H$ represents the Euclidean distance between the hue invariant moments of the two images, that is, the hue similarity. Similarly, $u_S$ represents the saturation similarity and $u_V$ represents the brightness similarity. Finally, the hue similarity, the saturation similarity and the brightness similarity are linearly combined to generate a similarity value ρ:

$$\rho = \omega_H u_h + \omega_S u_S + \omega_V u_V \qquad (22),$$

$\omega_H$、$\omega_S$ and $\omega_V$ are predefined weight coefficients and their sum is 1. These weight coefficients can be set in variant based on different search requirements. For example, the brightness level is the least important in general cases. Thus the weight coefficients are set as $\omega_H=0.4$、$\omega_S=0.4$ and $\omega_V=0.2$. In addition, in case of searching black and white images, hue and saturation have no meaning at all, and only brightness is concerned. Thus, the weight coefficients can be reset to be $\omega_H=0$, $\omega_S=0$ and $\omega_V=1$. In general, the weight coefficients can be set according to the importance of hue, saturation and brightness in the search conditions.

The image search and image characterization method provided by the invention is particularly useful for massive image search applications. For example, utility patent or trademark management, and general commercial image database management, even for image search engine on internet service.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. A method for image characterization, comprising:
providing an image comprising a plurality of pixels;
converting the image into Hue Saturation Value (HSV) model, each pixel comprising a hue level, a saturation level and a brightness level;
calculating color levels of the pixels respectively, the color levels comprise hue level, saturation level and brightness level; and
determining characteristics of the image according to the calculation result,
wherein the step of calculating the color levels of the pixels respectively comprises:
for each color level of hue, saturation and brightness:
calculating a first ratio of each level to generate a cumulative histogram, the first ratio of a certain level is calculated by dividing cumulative amount of pixels up to the certain level with the total amount of pixels in the image;
calculating a second ratio of each level to determine one or more key levels, the second ratio of a certain level is calculated by dividing the amount of pixels of the certain level with the total amount of pixels in the image; and
calculating one or more invariant moments of each key level according to the cumulative histogram;
wherein the characteristics comprise the one or more invariant moments,
wherein the step of calculating one or more invariant moments comprises:
generating one or more seed functions by applying the key level with a plurality of horizontal orders and vertical orders to a center moment cumulative function; and
generating a plurality of invariant moments corresponding to the key level by combining the one or more seed functions.

2. The method as claimed in claim 1, wherein the central moment cumulative function is:

$$u_{pq} = \sum_x \sum_y (x-\bar{x})^p (y-\bar{y})^q c_i,$$

and the seed function is:

$$\eta_{pq} = \frac{u_{pq}}{u_{00}^r},$$

wherein $$r = \frac{p+q}{2},$$

wherein $c_i$ is the key level, p is the horizontal order, q is the vertical order, (x, y) is the coordinate of each pixel in the image, and $(\bar{x}, \bar{y})$ is the coordinate of the image center of mass.

3. The method as claimed in claim 2, wherein the combination of the one or more seed functions is:

$\psi1=\eta20+\eta02$ $\psi2=(\eta20-\eta02)2+4\eta112$ $\psi3=(\eta30-3\eta12)2+(3\eta21-\eta03)2$ $\psi4=(\eta30+\eta12)2+(\eta21+\eta03)2,$ wherein $\psi1$, $\psi2$, $\psi$, and $\psi4$ are the plurality of invariant moments corresponding to the key level respectively.

4. A method for image search, comprising:
providing an image database comprising a plurality of images and corresponding characteristics;
providing an input image comprising a plurality of pixels;
calculating characteristics of the input image;
comparing the characteristics of the input image with the characteristics of the plurality of images in the image database;
wherein the step of calculating the characteristics of the input image comprises:
converting the input image into Hue Saturation Value (HSV) model, each pixel comprises a hue level, a saturation level and a brightness level; and
calculating the characteristics of the input image according to the hue levels, the saturation levels and the brightness levels of the plurality of pixels; and
wherein the characteristics of the plurality of images in the image database are calculated based on the step of calculating the characteristics,
wherein the step of calculating the characteristics comprises:
for each color level of hue, saturation and brightness:
calculating a first ratio of each level to generate a cumulative histogram, the first ratio of a certain level is calculated by dividing cumulative amount of pixels up to the certain level with the total amount of pixels in the image;
calculating a second ratio of each level to determine one or more key levels, the second ratio of a certain level is calculated by dividing the amount of pixels of the certain level with the total amount of pixels in the image; and
calculating one or more invariant moments of each key level according to the cumulative histogram;
wherein the characteristics comprise the one or more invariant moments,
wherein the step of calculating one or more invariant moments further comprises:
generating one or more seed functions by applying the key level with a plurality of horizontal orders and vertical orders to a center moment cumulative function; and
generating a plurality of invariant moments corresponding to the key level by combining the one or more seed functions.

5. The method as claimed in claim 4, wherein the central moment cumulative function is:

$$u_{pq} = \sum_x \sum_y (x - \bar{x})^p (y - \bar{y})^q c_i,$$

and the seed function is:

$$\eta_{pq} = \frac{u_{pq}}{u_{00}^r}$$

wherein $$r = \frac{p+q}{2},$$

wherein ci is the key level, p is the horizontal order, q is the vertical order, (x, y) is the coordinate of each pixel in the image, and $(\bar{x}, \bar{y})$ is the coordinate of the image center of mass.

6. The method as claimed in claim 5, wherein the combination of the one or more seed functions is:

ψ1=η20+η02

ψ2=(η20−η02)2+4η112

ψ3=(η30−3η12)2+(3η21−η03)2

ψ4=(η30+η12)2+(η21+η03)2, wherein ψ1, ψ2, ψ3 and ψ4 are invariant moments corresponding to the key level.

7. The method as claimed in claim 4, wherein the step of comparing the characteristics of the input image with the characteristics of the plurality of images in the image database comprises:

selecting a reference image and corresponding reference characteristics, the reference characteristics comprising at least one reference key hue level and corresponding plurality of reference hue invariant moments, at least one key saturation level and corresponding plurality of reference saturation invariant moments, at least one brightness level and corresponding plurality of reference brightness invariant moments;

applying the plurality of invariant moments corresponding to each of the key hue level with the plurality of reference hue invariant moments to an Euclidean distance formula to generate a hue similarity;

applying the plurality of invariant moments corresponding to each of the key saturation level with the plurality of reference saturation invariant moments to an Euclidean distance formula to generate a saturation similarity;

applying the plurality of invariant moments corresponding to each of the key brightness level with the plurality of reference brightness invariant moments to an Euclidean distance formula to generate a brightness similarity; and linearly combining the hue similarity, the saturation similarity and the brightness similarity to generate a similarity result.

8. The method as claimed in claim 7, wherein the step of linearly combining the hue similarity, the saturation similarity and the brightness similarity comprises:

respectively multiplying the hue similarity, the saturation similarity and the brightness similarity with a first weight coefficient, a second weight coefficient and a third weight coefficient and summing up the multiplied results to generate the similarity result, wherein the sum of the first, the second and the third weight coefficients is equal to 1.

9. The method as claimed in claim 7, further comprising outputting the reference characteristics of the reference image when the similarity result exceeds a threshold limit.

10. A method for image search, comprising:

providing an input image;

selecting a reference image from an image database;

determining a similarity result of the reference image to the input image according to characteristics of the reference image and the input image; and outputting the reference image and corresponding information when the similarity result exceeds a predetermined threshold, wherein the step of determining similarity result comprises:

determining similarity values with respect to hue, saturation and brightness levels according to the characteristics of the reference image and the input image;

multiplying the similarity value of each of the hue, saturation and brightness levels to a weight coefficient respectively;

summing the multiplied similarity values to generate the similarity result.

11. The method as claimed in claim 10, wherein the similarity values are determined according to the invariant moments of the reference mage and the input image.

12. The method as claimed in claim 10, wherein the weight coefficient of each of the hue, saturation and brightness levels is predefined by the importance of the level.

13. The method as claimed in claim 10, wherein the characteristics comprises: at least one key level and a plurality of invariant moments corresponding to the at least one key level in hue, saturation and brightness levels respectively.

14. The method as claimed in claim 13, wherein the at least one key level is the level having higher frequency to occur in the input image.

15. The method as claimed in claim 13, wherein the plurality of invariant moments are calculated according to a cumulative histogram in hue, saturation and brightness respectively.

* * * * *